United States Patent [19]

Forschirm

[11] Patent Number: 5,482,987
[45] Date of Patent: Jan. 9, 1996

[54] SELF-LUBRICATING THERMOPLASTIC POLYMER COMPOSITION

[75] Inventor: Alex Forschirm, Parsippany, N.J.

[73] Assignee: Hoechst Celanese Corporation, Somerville, N.J.

[21] Appl. No.: 396,048

[22] Filed: Feb. 28, 1995

[51] Int. Cl.$^6$ .................................................. C08K 5/20
[52] U.S. Cl. .................. 524/230; 524/502; 524/515; 524/521; 524/523; 524/528
[58] Field of Search ............................ 524/230, 317, 524/318, 432, 436, 487, 400, 502, 515, 521, 523, 528

[56] References Cited

U.S. PATENT DOCUMENTS 4,879,331  11/1989  Endo et al. ........................ 524/267

*Primary Examiner*—Jeffrey T. Smith
*Attorney, Agent, or Firm*—James M. Hunter, Jr.

[57] ABSTRACT

A self-lubricating composition containing at least about 70 to about 99.5 weight percent of a thermoplastic polymer and from about 30 to about 0.5 weight percent of a lubricating system, wherein the lubrication system contains high and low molecular weight polyethylenes, polyethylene waxes, metal salts, antioxidants and stabilizers. The composition is suitable for the fabrication of shaped articles, e.g., gears, pulleys, rollers and bearings, which exhibit improved friction and surface wear properties.

15 Claims, No Drawings

SELF-LUBRICATING THERMOPLASTIC POLYMER COMPOSITION

FIELD OF THE INVENTION

The present invention relates to self-lubricating, low wear compositions characterized as containing a thermoplastic polymer and lubricating system. Shaped articles prepared from the composition exhibit low friction properties as well as reduced surface wear under loads.

BACKGROUND OF THE INVENTION

Thermoplastic polymers, e.g., polyamides, polyesters, polyphenylene sulfide, polyoxymethylene, polyolefins, styrene polymers and polycarbonates, are characterized as exhibiting exceptional mechanical and electrical properties as well as good moldability and chemical resistance. However, these polymers may exhibit inadequate tribological properties when utilized in some frictional environments, e.g., plastic to metal, and plastic to plastic interfaces. While many lubricating compositions have been applied to thermoplastic polymers to improve friction and wear properties, certain applications prohibited the use of many desirable lubricants because of possible contamination, e.g., food handling, clothing preparation, and volatile environments.

Attempts have been made to improve the friction properties and reduce the surface wear of articles prepared from thermoplastic polymers by incorporating lubricants directly into thermoplastic polymers prior to the fabrication of shaped articles therefrom. Many materials in different combinations, including solid lubricants and fibers (e.g., graphite, mica, silica, talc, boron nitride and molybdenum sulfide), paraffin waxes, petroleum and synthetic lubricating oils, and polymers (e.g., polyethylene and polytetrafluoroethylene), have been added to thermoplastic polymers to improve the lubricating properties.

However, the addition of many of these additives in various combinations to thermoplastic polymers, while improving tribological properties have reduced other desirable physical and mechanical properties. Some lubricants have proven satisfactory for short terms at low speeds and loads, however, desirable friction properties of many of these lubricants significantly deteriorate over long periods of time under increased loads.

There is a desire for thermoplastic compositions possessing surface wear resistance and low friction properties under increasing loads over long periods of time. A suitable composition, when fabricated into a shaped article, should maintain the desired mechanical and physical properties long associated with thermoplastic polymers, and be non-contaminating when utilized in food handling and clothing manufacturing industries.

SUMMARY OF THE INVENTION

The present invention relates to a self-lubricating composition suitable for use in the fabrication of shaped articles having slidable surfaces, characterized as containing: (a) from about 70 to about 99.5 weight percent of a thermoplastic polymer; (b) from about 30 to about 0.5 weight percent of a lubricating system, characterized as: (i) at least about 60 to about 70 weight percent of a very high molecular weight polyethylene, characterized as exhibiting a molecular weight of at least about 500,000, a density of at least about 0.94 g/cm$^3$, and a mold flow index (MFI) of from about 0.4 to about 2.2 g/10 min.; (ii) at least about 20 to about 30 weight percent of a high density polyethylene homopolymer or copolymer, characterized as exhibiting a density of about 0.95g/cm$^3$, and a MFI of about 3.0 g/10 min; (iii) at least about 0.05 weight percent of an acid metal salt selected from calcium stearate and zinc stearate; (iv) at least about 0.05 weight percent of a low molecular weight, non-polar polyethylene wax, characterized as exhibiting a molecular weight of from about 5,000 to about 10,000; (v) at least about 0.05 weight percent of a fatty acid amide wax selected from bis-stearoylethylene-diamide and bis-palmitoylethylenediamide; and (vi) at least about 0.05 weight percent of a phenolic antioxidant/phosphite costabilizer, based on the total weight of the lubricating system; (c) at least about 0.08 weight percent of calcium ricinoleate or calcium hydroxystearate; (d) at least about 0.2 weight percent of a hindered phenol; (e) at least about 0.2 weight percent of oxymethylene copolymer crosslinked with diepoxide; and (f) at least about 0.01 weight percent of N,N'-ethylene bis-stearamide, based on the total weight of the composition.

The invention also relates to a method of improving the lubricity of thermoplastic articles, characterized by fabricating the article from a self-lubricating composition by admixing at least about 0.5 weight percent of the lubricating system and the thermoplastic polymer, based on the total weight of the composition, to produce a self-lubricating composition, and fabricating the composition into a shaped article, wherein the article exhibits improved surface and frictional properties. The composition is suitable for numerous frictional applications such as gears, pulleys, bearings, cams, sliding plates, guides, levers, rollers, conveyor belt links, etc.

DETAILED DESCRIPTION OF THE INVENTION

The self-lubricating composition of the present invention generally contains a thermoplastic polymer and a lubricating systems. The composition is characterized as containing from about 70 to about 99.5 weight percent of the thermoplastic polymer and from about 30 to about 0.5 weight percent of the lubricating system, based on the total weight of the composition. Typically, the composition contains from about 85 to about 99 weight percent of the thermoplastic polymer and from about 15 to about 1 weight percent of the lubricating system, based on the total weight of the composition. Preferably, the composition contains about 98 weight percent of the thermoplastic polymer, about 2 weight percent of the lubricating system.

The lubricating system is generally prepared prior to its addition to the polymers, and may be added along with suitable processing additives to the thermoplastic polymer. Processing additives which do not degrade the lubricating system, physical and mechanical properties of the polymer may be added thereto to aid in dispersion of the lubricating system within the polymer prior to compounding, extrusion and fabrication of shaped articles.

While the invention is generally directed to improving the surface wear and lubricity of thermoplastic resins selected from polyamides, polyesters, polyphenylene sulfide, polyoxymethylene, polyolefins, styrene polymers, and polycarbonates, a particularly preferred class of thermoplastic resins are polyoxymethylenes.

Oxymethylene polymers, i.e., polymeric acetals or polyoxymethylenes, useful in the invention are generally characterized as having recurring oxymethylene repeat units of the general formula:

—O—CH$_2$—

Polymeric acetals useful in preparing the self-lubricating composition of the present invention generally have a high content of oxymethylene units, i.e., generally greater than about 85 percent. These materials are commercially available from a number of manufacturers as homopolymers, copolymers, terpolymers, and the like. These highly crystalline acetals, described briefly hereinbelow, are well known in the art and have been reviewed extensively. For example, a review of polymeric acetals entitled, "Acetal Resins," by T. J. Dolce and J. A. Grates, may be found in the Second Edition of *Encyclopedia of Polymer Science and Engineering,* John Wiley and Sons, New York, 1985, Vol. 1, pp. 42–61. Additional information on acetal copolymers may be found in French Patent No. 1,221,148, as well as commonly assigned U.S. Pat. Nos. 3,027,352, 3,072,069, 3,147,234, and 3,210,318.

Typically, acetal homopolymers may be prepared by polymerizing anhydrous formaldehyde or trioxane. Oxymethylene homopolymers are usually stabilized against thermal degradation by end-capping with, for example, ester or ether groups, such as those derived from alkanoic anhydrides (e.g., acetic anhydride) or dialkyl ethers, (e.g., dimethyl ether) or by incorporating stabilizer compounds into the homopolymer. Commercially available acetal homopolymer is made by polymerizing anhydrous formaldehyde in the presence of an initiator after which the polymer is end-capped by acetylation of the hemiacetal end groups with acetic anhydride in the presence of sodium acetate catalyst. Methods for making end-capped acetal homopolymers are taught in U.S. Pat. Nos. 2,786,994 and 2,998,409. Acetal homopolymers are well known in the art and are commercially available under the trademarks DELRIN® and TENAC®.

Polymeric acetals which have been found to be especially suitable for use in the composition of the present invention are crystalline oxymethylene copolymers having repeat units which consist essentially of oxymethylene groups interspersed with oxy(higher alkylene) groups of the general formula:

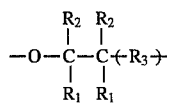

wherein each $R_1$ and $R_2$ is hydrogen, a lower alkyl group, or a halogen substituted lower alkyl group, each R3 is a methylene, oxymethylene, lower alkyl or haloalkyl substituted methylene or lower alkyl or haloalkyl substituted oxymethylene group, and n is zero or an integer from one to three, inclusive. Each lower alkyl group preferably contains one or two carbon atoms. Oxymethylene groups generally will constitute from about 85 to about 99.9 percent of the recurring units in such copolymers and are generally incorporated by ring-opening polymerization of trioxane in the presence of an acidic catalyst. Oxy(higher alkylene) groups are incorporated into the polymer by copolymerizing a cyclic ether or cyclic formal having at least two adjacent carbon atoms in the ring in addition to trioxane. The cyclic ether or formal may be incorporated by the breaking of an oxygen-to-carbon linkage. The preferred oxy(higher alkylene) group is oxyethylene, having the formula:

—O—CH$_2$—CH$_2$—

Oxyethylene may be incorporated into the polymer by copolymerization of ethylene oxide or 1,3-dioxolane with trioxane.

The preferred crystalline acetal copolymers, as described above which have a structure consisting essentially of oxymethylene and oxyethylene groups, exhibit a melting point of at least 150° C. They normally are millable or processible at temperatures ranging from about 175° C. to about 230° C., and are normally highly crystalline, having a polymer crystallinity from about 40 percent to about 90 percent or greater.

Typically, oxymethylene copolymers are stabilized after manufacture by degradation of unstable molecular ends of the polymer chains to a point where a relatively stable carbon-to-carbon linkage prevents further degradation of each end of the polymer chain. Such degradation of unstable molecular ends is generally effected by hydrolysis, as disclosed, for example, in U.S. Pat. No. 3,219,623 to Berardinelli. The oxymethylene copolymer may also be stabilized by end-capping, again using techniques well known to those skilled in the art, as for example by acetylation with acetic anhydride in the presence of sodium acetate catalyst.

A particularly preferred class of oxymethylene copolymers is commercially available under the trade name CELCON® acetal copolymer. CELCON acetal copolymers typically are copolymers of about 98 weight percent of trioxane and about 2 percent dioxolane. CELCON is a registered trademark of Hoechst Celanese Corporation. The compositions of the current invention may be made using any commercial grade of CELCON acetal, including CELCON grades U-10, M-25, M-90, M-270 and M-450. CELCON M-25 acetal copolymer exhibits a melt index of about 2.5 g/10 min when tested in accordance with ASTM D1238-82. CELCON M-90 acetal copolymer exhibits a lower molecular weight and melt viscosity than CELCON M-25. CELCON M-270 exhibits an even lower molecular weight and melt viscosity than CELCON M-25.

Oxymethylene terpolymers may also be used in making the self-lubricating compositions of the present invention. These terpolymers contain oxymethylene groups, oxy-(higher alkylene) groups such as those corresponding to the general formula:

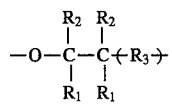

and a different third group which has been interpolymerized with the oxymethylene and oxy(higher alkylene) groups. A terpolymer as described above is typically made by reacting trioxane with a cyclic ether or cyclic acetal and a third monomer which is a bifunctional compound, such as a diglycide of the formula:

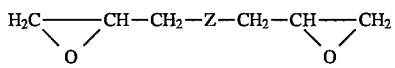

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy) group, preferably one having from 2 to 4 recurring lower alkoxy groups each with 1 or 2 carbon atoms. Examples of suitable bifunctional compounds include the diglycidyl ethers of ethylene glycol 1,2-propanediol, and 1,4-butanediol with the diglycidyl ether of 1,4-butanediol being preferred. Generally, when preparing such terpolymers, ratios of from 89.0 to 99.89 weight percent trioxane, 0.1 to 10 weight percent of the cyclic ether or cyclic acetal, and 0.0 1 to 1 weight percent of the bifunctional compound are preferred, based on the total weight of monomers used in forming the terpolymer. A particularly preferred oxymethylene terpolymer is commercially available from Hoechst Celanese Corporation under the name CELCON U-10 acetal polymer; a terpolymer of 1,4-butanediol diglycidyl ether, dioxolane and trioxane containing about 0.05 weight percent, 2.0 weight percent, and 97.95 weight percent, respectively, of repeating units derived from these three monomers, based on the total weight of the monomers. The oxymethylene-based terpolymers are made and stabilized by methods well known in the art which are generally analogous to those used from making the copolymers. More detailed descriptions of the methods for making oxymethylene-based terpolymers and their compositions can be found in previously cited patent references.

The oxymethylene polymers may be combined in various proportions by melt blending in extruders or similar apparatus to form suitable resins for preparing the self-lubricating composition of the invention. Generally, the polymers may be blended at temperatures from about 170° to about 230° C.

The lubricating system may be prepared by mechanically admixing, i.e., blending, a polyolefin composition characterized as containing: (a) from about 60 to about 98 weight percent of a very high molecular weight polyethylene, characterized as exhibiting a molecular weight of from about 500,000 to about 600,000, a density of from about 0.94 to about 0.99 g/cm$^3$, and a mold flow index (MFI) of from about 0.4 to about 2.2 g/10 min.; (b) from about 20 to about 40 weight percent of a high density polyethylene homopolymers or copolymers, characterized as exhibiting a density of about 0.95 g/cm$^3$, and a MFI of about 3.0 g/10 min.; (c) from about 0.05 to about 1.00 weight percent of an acid metal salt selected from calcium stearate and zinc stearate; (d) from about 0.05 to about 5.00 weight percent of a low molecular weight, non-polar polyethylene wax, characterized as exhibiting a molecular weight of from about 5,000 to about 10,000; (e) from about 0.05 to about 5.00 weight percent of N,N'-ethylene bis-stearamide, characterized as exhibiting a melting point of 143° C.; and (f) from about 0.05 to about 3.00 weight percent of phenolic antioxidant/phosphite costabilizer, based upon the total weight percent of the lubricating system.

Other processing additives which may be admixed with the self-lubricating composition of the invention are hindered phenols, calcium ricinoleate or calcium hydroxystearate, an oxymethylene copolymer crosslinked with diepoxide, and N,N'-ethylene bis-stearamide. The hindered phenols useful in the present invention are generally known as antioxidants or free radical inhibitors. At least one of 2,2'-methylenebis( 4-methyl-6-t-butylphenol), hexamethyleneglycol-bis(3,5-di-t-butyl-4-hydroxyhydrocinnamate), tetrabis[methylene(3,5-di-t-butyl-4hydroxyhydrocinnamate)] methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)benzen,p-octadecyl-3-(4'-hydroxy-3',5'-di-t-butyl-phenol)propionate, 4,4'-methylenebis( 2,6-di-t-butylphenol), 4,4'-butylidene-bis-(6-t-butyl-3-methylphenol), 2,2'-thiodiethyl-bis-[3-(3,5-di-t-butyl-4-hydroxyphenol)]propionate, di-stearyl-3,5-di-t-butyl-4-hydroxybenzylphosphonate and 2-t-butyl-6-(3-t-butyl-5-methyl-2-hydroxybenzyl)- 4-methylphenylacrylate may be used. However, the useful hindered phenols are not limited to these compounds. Other hindered or stereo-obstructing phenols of the same kind as the above described ones are effective. Of them, hexamethyleneglycol-bis(3,5-di-t-butyl-4-hydroxyhydrocinnamate), for example Irganox 259 made by Ciba Geigy Ltd., tetrakis[methylene(3,5-di-t-butyl-4-hydroxyhydrocinnamate)] methane, for example Irganox 1010 made by Ciba Geigy Ltd. and triethyleneglycol-bis-3-(3-t-butyl-4-hydroxy-5-methylphenyl) propionate, for example Irganox 245 made by Ciba Geigy Ltd are effective. A preferred hindered phenol is hexamethyleneglycol-bis(3,5-di-t-butyl-4-hydroxyhydrocinnamate). The N,N'-ethylene bis-stearamide useful in the invention is marketed under the tradename of Acrawax® C by Lonza, Inc.

One preferred embodiment of the invention entails preparing the self-lubricating polyoxymethylene composition useful for the fabrication of shaped articles having slidable surfaces characterized by the steps of:

(a) selecting an oxymethylene polymer from the group consisting of:
  i) oxymethylene homopolymer;
  ii) oxymethylene copolymer comprising about 85 to about 99.9 percent oxymethylene repeat units interspersed with repeat units of the formula:

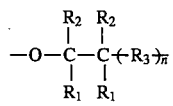

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive;
  iii) oxymethylene terpolymer, which is the reaction product of trioxane, a cyclic ether and/or a cyclic acetal, and a diglycidyl ether of the formula:

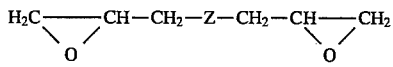

wherein Z is selected from the group consisting of a carbon-to-carbon bond, oxygen, an oxyalkoxy unit of 1 to 8 carbon atoms, and an oxypoly(lower alkoxy) unit; and
  iv) mixtures of i), ii) and iii);

(b) admixing from about 70 to about 99.5 weight percent of the polymer with about 30 to about 0.5 weight percent of a lubricating system, based on the total weight of the composition, containing: (i) from about 60 to about 70 weight percent of a very high molecular weight polyethylene, characterized as exhibiting a molecular weight of from about 500,000 to about 600,000, and a density of at least about 0.94 g/cm$^3$; (ii) at least about 20 to about 30 weight percent of a high density polyethylene homopolymers or copolymers; (iii) at least about 0.05 weight percent of an acid metal salt; (iv) at least about 0.05 weight percent of a nonpolar polyethylene wax characterized as exhibiting a molecular weight of from about 5,000 to about 10,000; (v) at least about 0.05 weight percent of a fatty amide wax; and (vi) at least about 0.05 weight percent of phenolic antioxidant containing phosphite and phosphonite costabilizers, based on the total weight of the lubricating system;

(c) further admixing with the polyoxymethylene and lubricating system at least about 0.05 weight percent of calcium ricinoleate or calcium hydroxystearate, at least about 0.1 weight percent of a hindered phenol, at least about 0.1 weight percent of oxymethylene copolymer crosslinked with diepoxide, and at least about 0.08 weight percent of N,N'-ethylene bis-stearamide, based on the total weight of the composition to form a well dispersed self-lubricating composition; and (d) forming a self-lubricating composition wherein the lubricating system is well dispersed within the composition.

Numerous additives known to those skilled in the art may also be included in the self-lubricating composition providing, however, that the tribological and wear properties of the composition are not compromised. These additives, which may provide desirable properties to the composition, include mold lubricants, plasticizers, glass fibers, nucleating agents, antioxidants, formaldehyde scavengers, chain scission inhibitors, ultraviolet light inhibitors, impact modifiers, acid scavengers, colorants, etc.

The composition may be formed into self-lubricating shaped articles, e.g., bearings, gears, cams, rollers, sliding plates, pulleys, levers, guides, conveyor links, etc., which are useful in numerous applications ranging from business machines to automotive parts and electrical appliances, including the food handling and clothing manufacturing machines, or wherever low friction and reduced wear properties are desirable.

Test disks were prepared for testing wear and friction properties by cleaning in a sonic bath of methanol, drying in air, and weighing to one-tenth (1/10) of a milligram. The disks were tested for tribology properties according to a Pin-on-Disk Wear Test. In accordance with the test, a machined NYLATRON nylon pin with a tip radius of about 0.187 inches was mounted on the upper spindle of a Falex Friction and Wear Test apparatus, about 0.4688 inches from the center of the test disk, which was mounted on the lower spindle thereof. A force of about 20 pounds was applied to the test disk by means of an air cylinder and the disk was pressed against the spherical pin tip. A rotational velocity of about 425 rpm ( 104.3 ft/min) was applied to the test disk by means of an air cylinder and a drive motor. During the test, a stream of air at 40 standard cubic feet per hour (SCFH) and a distance of 2 inches was directed against the disk surface to remove debris. Testing times ranged from about 0.5 to about 65 hours. After the test, the pin tip and disk were separated from contact and the disk was cleaned of debris by blowing the surface with compressed air, and the disk was reweighed for weight loss. Torque ($\Gamma$), measured during the test, was converted into a coefficient of friction ($f$) by application of the equation, based on the load and velocity placed on the apparatus, as follows:

$$f=\Gamma(2.137/20)$$

Results of surface wear and coefficients of friction are given in Table I, hereinafter.

The following examples are general illustrations of methods for preparing the polymeric composition and shaped articles of the invention. They are provided for purposes of exemplification only as should be appreciated from the foregoing discussion.

EXAMPLE 1

To prepare the blend of the self-lubricating composition containing 1% of the lubricating system, the following components were utilized:

a) 214.94 lbs of polyoxymethylene copolymer unstabilized flake (97.7 wt %);

b) 1.1 lbs of polyoxymethylene copolymer pellets, crosslinked with diepoxide (0.5 wt %);

c) 199.76 gm of N,N'-ethylene bis-stearamide (0.2 wt %);

d) 1 lbs of hexamethyleneglycol-bis(3,5-di-t-butyl-4-hydroxyhydrocinnamate) (0.5 wt %);

e) 99.88 gm of calcium ricinoleate (0.1 wt %); and f) 2.2 lbs of the lubricating system (1 wt % of the total composition).

The components were briefly tumbled in a barrel followed by high speed mixing for 30 sec in a Henschel mixer to form a mixture. Thereafter, the mixture was extruded into strands in a Werner and Pfleiderer twin screw ZSK extruder, previously heated and purged with polyacetal pellets. The extruder zones were operated at 372° to 387° F., the melt temperature was 415° F. and under a vacuum of 27 in Hg, and the screw speed was 150 rpm. Strands of extrudate were produced at a rate of 38 lbs/hr.

Thereafter, the strands were quenched in cold water and cut into pellets. The pellets were injection molded at temperatures of 180° to 200° F. and conventional pressure, velocity and cycle time settings, a nozzle temperature setting of 360° to 420° F., and barrel temperature setting of 350° to 420° F. to form 1.25 in diameter disks, each weighing about 7 gm. The disks were analyzed for weight loss and coefficient of friction after 0.5, 1.5, 17 and 65 hours. Results of analyses are presented in TABLE I.

EXAMPLE 2

To prepare the blend of the polymeric composition containing 2% of the lubricating system, the following components were utilized:

a) 212.74 lbs. of polyoxymethylene copolymer unstabilized flake;

b) 1.1 lbs of polyoxymethylene copolymer pellets, crosslinked with diepoxide;

c) 199.76 gm of N,N'-ethylene bis-stearamide;

d) 1.1 lbs of hexamethyleneglycol-bis(3,5-di-t-butyl-4-hydroxyhydrocinnamate);

e) 99.88 gm of calcium ricinoleate; and f) 4.4 lbs of the lubricating system (2 wt % of total the composition).

The components were mixed, extruded and molded according to the process of Example 1 to form nominal 7 gm disks for weight loss and coefficient of friction analyses. Results of the analyses are presented in TABLE I.

EXAMPLE 3

To prepare the blend of the polymeric composition containing 3% of the lubricating system, the following components were utilized:

a) 210.54 lbs of polyoxymethylene copolymer unstabilized flake;

b) 1.1 lbs of polyoxymethylene copolymer pellets, crosslinked with diepoxide;

c) 199.76 gm of N,N'-ethylene bis-stearamide;

d) 1.1 lbs of hexamethyleneglycol-bis(3,5-di-t-butyl-4-hydroxyhydrocinnamate);

e) 99.88 gm of calcium ricinoleate; and f) 6.6 lbs of the lubricating system (3 wt % of total the composition).

The components were mixed, extruded and molded according to the process of Example 1 to form 7 gm disks for weight loss and coefficient of friction analyses. Results of the analyses are presented in TABLE I.

EXAMPLE 4

To prepare the blend of the polymeric composition containing 4% of the lubricating system, the following components were utilized:
- a) 208.34 lbs of polyoxymethylene copolymer unstabilized flake;
- b) 1.1 lbs of polyoxymethylene copolymer pellets, crosslinked with diepoxide;
- c) 199.76 gm of N,N'-ethylene bis-stearamide;
- d) 1.1 lbs of hexamethyleneglycol-bis(3,5-di-t-butyl-4-hydroxyhydrocinnamate);
- e) 99.88 gm of calcium ricinoleate; and
- f) 8.8 lbs of the lubricating system (4 wt % of total the composition).

The components were mixed, extruded and molded according to the process of Example 1 to form 7 gm disks for weight loss and coefficient of friction analyses. Results of the analyses are presented in TABLE I.

EXAMPLE 5

To prepare the blend of the polymeric composition containing 5% of the lubricating system, the following components were utilized:
- a) 184.7 lbs of polyoxymethylene copolymer unstabilized flake;
- b) 1.0 lbs of polyoxymethylene copolymer pellets, crosslinked with diepoxide;
- c) 181.6 gm of N,N'-ethylene bis-stearamide;
- d) 1.0 lbs of hexamethyleneglycol-bis(3,5-di-t-butyl-4-hydroxyhydrocinnamate);
- e) 90.8 gm of calcium ricinoleate; and
- f) 10 lbs of the lubricating system (5 wt % of total the composition).

The components were mixed, extruded and molded according to the process of Example 1 to form 7 gm disks for weight loss and coefficient of friction analyses. Results of the analyses are presented in TABLE I.

COMPARATIVE EXAMPLE 6

As a comparative example, a polymeric composition was prepared by substituting HOSTAFLON® TF 9203 polytetrafluoroethylene (1.5 wt % PTFE) for the lubricating system of Example 1, the following components were utilized:
- a) 213.84 lbs of polyoxymethylene copolymer unstabilized flake;
- b) 1.1 lbs of polyoxymethylene copolymer pellets, crosslinked with diepoxide;
- c) 199.76 gm of N,N'-ethylene bis-stearamide;
- d) 1.1 lbs of hexamethyleneglycol-bis(3,5-di-t-butyl-4-hydroxyhydrocinnamate);
- e) 99.88 gm of calcium ricinoleate; and
- f) 3.3 lbs of the PTFE (1.5 wt % of total the composition).

The components were mixed, extruded and molded according to the process of Example 1 to form 7 gm disks for weight loss and coefficient of friction analyses. Results of the analyses are presented in TABLE I.

COMPARATIVE EXAMPLE 7

As another comparative example, a polymeric composition was prepared by substituting 3.0 wt % PTFE for the lubricating system of Example 1, the following components were utilized:
- a) 210.54 lbs of polyoxymethylene copolymer unstabilized flake;
- b) 1.1 lbs of polyoxymethylene copolymer pellets, crosslinked with diepoxide;
- c) 199.76 gm of N,N'-ethylene bis-stearamide;
- d) 1.1 lbs of hexamethyleneglycol-bis(3,5-di-t-butyl-4-hydroxyhydrocinnamate);
- e) 99.88 gm of calcium ricinoleate; and
- f) 6.6 lbs of the PTFE (3.0 wt % of total the composition).

The components were mixed, extruded and molded according to the process of Example 1 to form 7 gm disks for weight loss and coefficient of friction analyses. Results of the analyses are presented in TABLE I.

COMPARATIVE EXAMPLE 8

As a comparative example, a polymeric composition was prepared without the addition of the lubricating system (0 wt % of the lubricating system) utilizing the following components:
- a) 217.14 lbs of polyoxymethylene copolymer unstabilized flake;
- b) 1.1 lbs of polyoxymethylene copolymer pellets, crosslinked with diepoxide;
- c) 199.76 gm of N,N'-ethylene bis-stearamide;
- d) 1.1 lbs of hexamethyleneglycol-bis(3,5-di-t-butyl-4-hydroxyhydrocinnamate);
- e) 99.88 gm of calcium ricinoleate; and
- f) 0 lbs of the lubricating system The components were mixed, extruded and molded according to the process of Example 1 to form 7 gm disks for weight loss and coefficient of friction analyses. Results of the analyses are presented in TABLE I.

TABLE I

| | | Wt. Loss, mg[1]/Coefficient of Friction Time, hrs. | | | |
| --- | --- | --- | --- | --- | --- |
| Ex. | Lub., wt % | 0.5 | 1.5 | 17 | 65 |
| 1 | 1 | 1.7 | 1.7 | 4/0.075 | 84 |
| 2 | 2 | 0.8 | 1.2 | 3/0.064 | 60 |
| 3 | 3 | 1.0 | 1.5 | 4.9/0.096 | 49 |
| 4 | 4 | 1.3 | 1.4 | 4.7/0.096 | nd[2] |
| 5 | 5 | 1.2 | 1.4 | 4.5/0.053 | 30 |
| 6 | 1.5 PTFE | 8.1 | 15.9 | 122/0.14 | 181 |
| 7 | 3.0 PTFE | 3.4 | 12.2 | 87/0.13 | 155 |
| 8 | 0 | 1.9 | 9.6 | 109/0.12 | 243 |

[1]load of 20 pounds, velocity of 104.3 ft/min
[2]no data

I claim:

1. A self-lubricating composition suitable for use in the fabrication of shaped articles having slidable surfaces, comprising: (a) from about 70 to about 99.5 weight percent of a thermoplastic polymer; (b) from about 30 to about 0.5 weight percent of a lubricating system, comprising: (i) at least about 60 to about 70 weight percent of a very high molecular weight polyethylene, exhibiting a molecular weight of at least about 500,000, a density of about 0.94 g/cm$^3$, and a mold flow index (MFI) of from about 0.4 to about 2.2 g/10 min.; (ii) at least about 20 to about 30 weight percent of a high density polyethylene homopolymer or copolymer, characterized as exhibiting a density of about 0.95g/cm³, and a MFI of about 3.0 g/10 min; (iii) at least about 0.05 weight percent of an acid metal salt; (iv) at least about 0.05 weight percent of a low molecular weight, non-polar polyethylene wax, exhibiting a molecular weight of from about 5,000 to about 10,000; (v) at least about 0.05 weight percent of a fatty acid amide wax; and (vi) at least about 0.05 weight percent of phenolic antioxidant/phosphite costabilizer, based on the total weight of the lubricating system, (c) at least about 0.08 weight percent of calcium ricinoleate or calcium hydroxystearate; (d) at least about 0.2 weight percent of a hindered phenol; (e) at least about 0.2 weight percent of oxymethylene copolymer, crosslinked with diepoxide; and (f) at least about 0.01 weight percent of N,N'-ethylene bis-stearamide, based on the total weight of the composition.

2. The composition according to claim 1, wherein the thermoplastic polymer is selected from the group consisting of polyamides, polyesters, polyphenylene sulfide, polyoxymethylene, polyolefins, styrene polymers and polycarbonates.

3. The composition according to claim 2, wherein the thermoplastic polymer is polyoxymethylene.

4. The composition according to claim 3, wherein the polyoxymethylene is selected from the group consisting of:

i) oxymethylene homopolymers;
  ii) oxymethylene copolymers comprising about 85 to about 99.9 percent oxymethylene repeat units interspersed with repeat units of the formula:

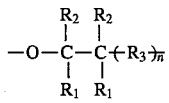

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive;
  iii) oxymethylene terpolymers, which are the reaction products of trioxane and, a cyclic ether and/or a cyclic acetal, and a diglycidyl ether of the formula:

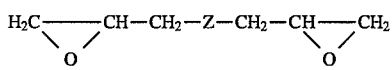

wherein Z is selected from the group consisting of a carbon-to-carbon bond, oxygen, an oxyalkoxy unit of 1 to 8 carbon atoms, and an oxypoly(lower alkoxy) unit; and
  mixtures of i), ii) and iii).

5. The composition according to claim 4, wherein the lubricating system comprises about 70 weight percent of high molecular weight polyethylene and about 30 weight percent of high density polyethylene homopolymer.

6. The composition according to claim 5, wherein the acid metal salt is selected from the group consisting of zinc stearate, calcium stearate and mixtures thereof.

7. The composition according to claim 6, the composition further consists essentially of about 7 weight percent of paraffin waxes.

8. The composition according to claim 7, wherein the fatty acid amide wax is selected from the group consisting of bis-stearoethylenediamide and bis-palmitoylethylene diamide.

9. The composition according to claim 8, wherein the hindered phenol is hexamethyleneglycol-bis(3,5-di-t-butyl-4-hydroxyhydrocinnamate).

10. The composition according to claim 9, wherein the polyoxymethylene is oxymethylene copolymer consists essentially of about 85 to about 99.9 percent oxymethylene repeat units interspersed with repeat units of the formula:

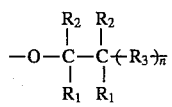

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive.

11. A method of preparing a self-lubricating thermoplastic polymer composition useful for the fabrication of shaped articles having slidable surfaces, comprising the steps of:

(a) selecting a thermoplastic polymer selected from the group consisting of polyamides, polyesters, polyphenylene sulfide, polyoxymethylene, polyolefins, styrene polymers and polycarbonates;
  (b) admixing from about 70 to about 99.5 weight percent of the polymer and from about 30 to about 0.5 weight percent of a lubricating system, comprising: (i) at least about 60 to about 70 weight percent of a very high molecular weight polyethylene exhibiting a molecular weight of from about 500,000 to about 600,000 and a density of about 0.94 g/cm³; (ii) at least about 20 to about 30 weight percent of a high density polyethylene homopolymer or copolymer; (iii) at least about 0.05 weight percent of an acid metal salt; (iv) at least about 0.05 weight percent of a non-polar polyethylene wax exhibiting a molecular weight of from about 5,000 to about 10,000; (v) at least about 0.05 weight percent of a fatty amide wax; and (vi) at, least about 0.05 weight percent of phenolic antioxidant comprising phosphite and phosphonite costabilizers, based on the total weight of the lubricating system; and
  (c) further admixing with the polyoxymethylene and lubricating system at least about 0.05 weight percent of calcium ricinoleate or calcium hydroxystearate, at least about 0.10 weight percent of a hindered phenol, at least about 0.10 weight percent of oxymethylene copolymer crosslinked with diepoxide, and at least about 0.08 weight percent of N,N'-ethylene bis-stearamide, based on the total weight of the composition to form a well dispersed self-lubricating composition.

12. The method according to claim 11, wherein the thermoplastic polymer is polyoxymethylene.

13. The method according to claim 12, wherein the polyoxymethylene is selected from the group consisting of:

i) oxymethylene homopolymer;

ii) oxymethylene copolymer comprising about 85 to about 99.9 percent oxymethylene repeat units interspersed with repeat units of the formula:

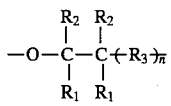

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive;

iii) oxymethylene terpolymer, which is the reaction product of trioxane, a cyclic ether and/or a cyclic acetal, and a diglycidyl ether of the formula:

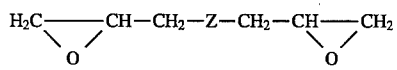

wherein Z is selected from the group consisting of a carbon-to-carbon bond, oxygen, an oxyalkoxy unit of 1 to 8 carbon atoms, and an oxypoly(lower alkoxy) unit;

and iv) mixtures of i), ii) and iii)

14. The method according to claim 13, wherein the polyoxymethylene is oxymethylene copolymer consists of about 85 to about 99.9 percent oxymethylene repeat units interspersed with repeat units of the formula:

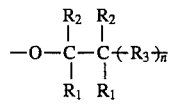

wherein each $R_1$ and R2 is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive.

15. The method according to claim 14, wherein the lubricating system comprises about 70 weight percent of a very high molecular weight polyethylene and about 30 weight percent of high density polyethylene homopolymer.

* * * * *